United States Patent
Wobben

(10) Patent No.: US 7,462,946 B2
(45) Date of Patent: Dec. 9, 2008

(54) METHOD FOR OPERATING A WIND ENERGY PLANT

(76) Inventor: Aloys Wobben, Argestrasse 19, Aurich (DE) 26607

( * ) Notice: Subject to any disclaimer, the term of this patent is extended or adjusted under 35 U.S.C. 154(b) by 0 days.

(21) Appl. No.: 10/475,531

(22) PCT Filed: Apr. 12, 2002

(86) PCT No.: PCT/EP02/04109

§ 371 (c)(1),
(2), (4) Date: May 7, 2004

(87) PCT Pub. No.: WO02/086314

PCT Pub. Date: Oct. 31, 2002

(65) Prior Publication Data

US 2004/0207206 A1 Oct. 21, 2004

(30) Foreign Application Priority Data

Apr. 20, 2001 (DE) .............................. 101 19 624
Aug. 4, 2001 (DE) .............................. 101 38 399

(51) Int. Cl.
*F03D 9/00* (2006.01)
*H02P 9/04* (2006.01)

(52) U.S. Cl. ..................................................... 290/44
(58) Field of Classification Search ................ 290/44
See application file for complete search history.

(56) References Cited

U.S. PATENT DOCUMENTS

| | | | |
|---|---|---|---|
| 1,936,801 A | 11/1933 | Nycum | 307/104 |
| 1,956,461 A | 4/1934 | Butow | 361/44 |
| 2,607,910 A * | 8/1952 | Ransom et al. | 320/123 |
| 3,071,720 A | 1/1963 | Geissing | 363/87 |
| 3,184,643 A * | 5/1965 | Schultz, Sr. | 361/75 |
| 3,386,002 A | 5/1968 | Russell | 361/50 |
| 3,514,682 A | 5/1970 | Corey | 318/761 |
| 3,708,734 A | 1/1973 | Rowe | 318/762 |
| 3,809,979 A | 5/1974 | Zarth | 318/762 |

(Continued)

FOREIGN PATENT DOCUMENTS

AU 2002319133 B9 11/2002

(Continued)

OTHER PUBLICATIONS

Arsudis, D., "Doppeltgespeister Drehstromgenerator mit Spannungszwschenkreis-Umrichter im Rotorkreis für Windkraftanlagen," Dissertation, University Braunschweig, 1989, pp. 1-63.

(Continued)

*Primary Examiner*—Darren Schuberg
*Assistant Examiner*—Pedro J Cuevas
(74) *Attorney, Agent, or Firm*—Seed IP Law Group PLLC

(57) ABSTRACT

The present invention relates to a method for operating a wind turbine with a generator, drivable by a rotor, for supplying electrical power to an electrical load, in particular an electric grid. In order to compensate for fluctuations in the grid as far as possible, the system of the kind initially specified is developed in such a way that the power delivered to the load by the generator is regulated in response to a current outputted to the load.

41 Claims, 3 Drawing Sheets

U.S. PATENT DOCUMENTS

Figure 1:
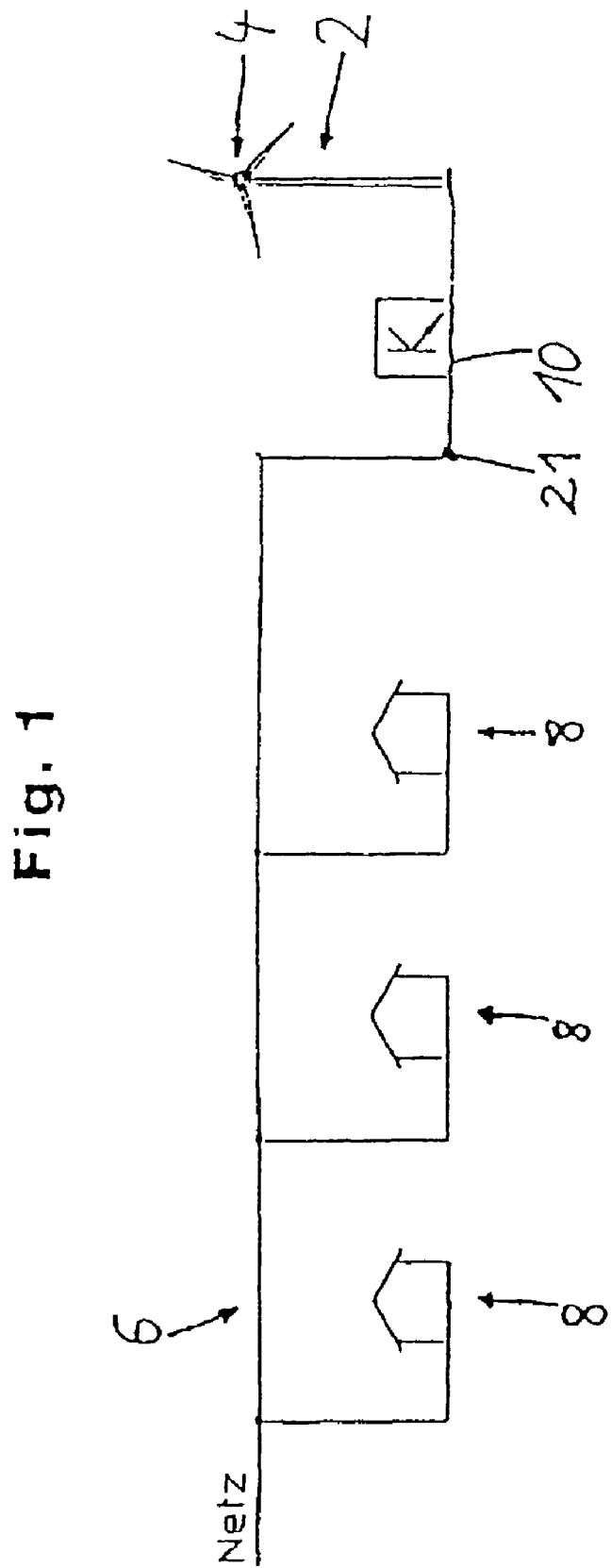

| | | | | |
|---|---|---|---|---|
| 3,828,281 A * | 8/1974 | Chambers, Jr. | | 333/17.1 |
| 3,897,595 A | 7/1975 | Fearno | | 318/762 |
| 4,115,727 A | 9/1978 | Gross | | 318/762 |
| 4,129,475 A | 12/1978 | Spurgin et al. | | 376/217 |
| 4,280,059 A | 7/1981 | Zickwolf, Jr. | | 290/40 B |
| 4,281,386 A * | 7/1981 | Kondow et al. | | 700/293 |
| 4,297,738 A * | 10/1981 | Lee | | 361/42 |
| 4,380,083 A | 4/1983 | Andersson et al. | | 375/376 |
| 4,482,853 A | 11/1984 | Bhavsar | | 318/778 |
| 4,511,807 A | 4/1985 | Somerville | | 290/44 |
| 4,535,252 A | 8/1985 | Jacobs et al. | | 290/44 |
| 4,605,530 A | 8/1986 | Tatemichi | | 376/237 |
| 4,695,736 A | 9/1987 | Doman et al. | | 290/44 |
| 4,719,415 A * | 1/1988 | Mehnert | | 324/96 |
| 4,752,726 A | 6/1988 | Aoyama | | 323/207 |
| 4,755,738 A | 7/1988 | Shimamura et al. | | 323/210 |
| 4,814,694 A | 3/1989 | Takahashi et al. | | 324/95 |
| 4,891,744 A * | 1/1990 | Yamamoto et al. | | 363/89 |
| 4,982,147 A * | 1/1991 | Lauw | | 318/729 |
| 4,994,684 A | 2/1991 | Lauw et al. | | 290/52 |
| 5,006,781 A | 4/1991 | Schultz et al. | | 322/25 |
| 5,083,039 A | 1/1992 | Richardson et al. | | 290/44 |
| 5,168,208 A * | 12/1992 | Schultz et al. | | 322/25 |
| 5,181,026 A * | 1/1993 | Granville | | 340/870.28 |
| 5,216,621 A * | 6/1993 | Dickens | | 702/58 |
| 5,225,712 A | 7/1993 | Erdman | | 290/44 |
| 5,237,511 A * | 8/1993 | Caird et al. | | 702/58 |
| 5,278,773 A * | 1/1994 | Cousineau | | 700/287 |
| 5,293,411 A | 3/1994 | Miyamoto et al. | | 376/210 |
| 5,349,364 A * | 9/1994 | Bryanos et al. | | 343/853 |
| 5,369,353 A * | 11/1994 | Erdman | | 323/207 |
| 5,390,068 A * | 2/1995 | Schultz et al. | | 361/95 |
| 5,396,165 A * | 3/1995 | Hwang et al. | | 323/210 |
| 5,418,446 A * | 5/1995 | Hallidy | | 322/28 |
| 5,420,495 A * | 5/1995 | Hingorani | | 323/218 |
| 5,422,826 A * | 6/1995 | Cousineau | | 700/287 |
| 5,506,789 A * | 4/1996 | Russell et al. | | 702/58 |
| 5,524,128 A | 6/1996 | Mowry et al. | | 376/236 |
| 5,528,444 A * | 6/1996 | Cooke et al. | | 361/20 |
| 5,528,445 A * | 6/1996 | Cooke et al. | | 361/20 |
| 5,536,976 A * | 7/1996 | Churchill | | 307/11 |
| 5,610,501 A * | 3/1997 | Nelson et al. | | 323/207 |
| 5,684,389 A | 11/1997 | Tyll et al. | | 323/209 |
| 5,706,158 A * | 1/1998 | Muller | | 361/87 |
| 5,729,120 A * | 3/1998 | Stich et al. | | 323/237 |
| 5,734,257 A * | 3/1998 | Schauder et al. | | 323/207 |
| 5,734,586 A * | 3/1998 | Chiang et al. | | 700/286 |
| 5,754,035 A * | 5/1998 | Sen | | 323/207 |
| 5,798,631 A * | 8/1998 | Spee et al. | | 322/25 |
| 5,798,632 A | 8/1998 | Muljadi | | 322/29 |
| 5,798,634 A | 8/1998 | Terada et al. | | 323/207 |
| 5,825,162 A * | 10/1998 | Kida et al. | | 323/210 |
| 5,873,251 A | 2/1999 | Iino | | 60/660 |
| 5,890,097 A * | 3/1999 | Cox | | 702/67 |
| 5,899,960 A * | 5/1999 | Moore et al. | | 702/67 |
| 5,907,192 A | 5/1999 | Lyons et al. | | 290/44 |
| 5,953,238 A | 9/1999 | Mowry et al. | | 703/6 |
| 5,963,457 A * | 10/1999 | Kanoi et al. | | 700/291 |
| 6,008,633 A * | 12/1999 | Schettler | | 323/361 |
| 6,081,104 A * | 6/2000 | Kern | | 323/268 |
| 6,091,615 A * | 7/2000 | Inoshita et al. | | 363/98 |
| 6,093,975 A * | 7/2000 | Peticolas | | 290/52 |
| 6,128,204 A | 10/2000 | Munro et al. | | 363/41 |
| 6,144,924 A * | 11/2000 | Dowling et al. | | 702/60 |
| 6,175,810 B1 * | 1/2001 | Jurisch | | 702/58 |
| 6,188,205 B1 | 2/2001 | Tanimoto et al. | | 323/205 |
| 6,215,202 B1 * | 4/2001 | Luongo et al. | | 307/64 |
| 6,281,601 B1 * | 8/2001 | Edelman et al. | | 307/29 |
| 6,313,752 B1 * | 11/2001 | Corrigan et al. | | 340/657 |
| 6,404,075 B1 | 6/2002 | Potter et al. | | 307/64 |
| 6,496,757 B1 * | 12/2002 | Flueck et al. | | 700/292 |
| 6,498,462 B2 | 12/2002 | Ballantine et al. | | 322/8 |
| 6,512,966 B2 * | 1/2003 | Lof et al. | | 700/291 |
| 6,518,736 B2 * | 2/2003 | Sasaki et al. | | 322/16 |
| 6,535,797 B1 * | 3/2003 | Bowles et al. | | 700/286 |
| 6,664,653 B1 * | 12/2003 | Edelman | | 290/52 |
| 6,671,585 B2 * | 12/2003 | Lof et al. | | 705/36 R |
| 6,681,156 B1 * | 1/2004 | Weiss | | 700/291 |
| 6,687,574 B2 * | 2/2004 | Pietrowicz et al. | | 700/293 |
| 6,690,224 B2 * | 2/2004 | Moore | | 327/296 |
| 6,693,409 B2 * | 2/2004 | Lynch et al. | | 323/208 |
| 6,714,427 B1 * | 3/2004 | Barthold | | 363/51 |
| 6,769,873 B2 * | 8/2004 | Beauchamp et al. | | 416/3 |
| 6,784,634 B2 * | 8/2004 | Sweo | | 318/727 |
| 6,812,586 B2 * | 11/2004 | Wacknov et al. | | 290/52 |
| 6,838,781 B2 * | 1/2005 | van de Loo | | 290/40 B |
| 6,838,860 B2 * | 1/2005 | Huggett et al. | | 322/46 |
| 6,870,279 B2 * | 3/2005 | Gilbreth et al. | | 290/52 |
| 6,891,281 B2 * | 5/2005 | Wobben | | 290/44 |
| 6,921,985 B2 | 7/2005 | Janssen et al. | | 290/44 |
| 6,924,991 B2 * | 8/2005 | Skeist et al. | | 363/21.02 |
| 6,958,550 B2 * | 10/2005 | Gilbreth et al. | | 290/52 |
| 6,984,897 B2 * | 1/2006 | Skeist et al. | | 290/44 |
| 6,990,395 B2 * | 1/2006 | Ransom et al. | | 700/295 |
| 7,068,480 B2 * | 6/2006 | Wong et al. | | 361/42 |
| 7,091,702 B2 * | 8/2006 | Mrowiec et al. | | 322/36 |
| 7,092,798 B2 * | 8/2006 | Mansingh et al. | | 700/292 |
| 7,116,010 B2 | 10/2006 | Lasseter et al. | | 307/45 |
| 7,117,105 B2 * | 10/2006 | Premerlani et al. | | 702/58 |
| 7,119,452 B2 * | 10/2006 | Larsen | | 290/55 |
| 7,151,329 B2 * | 12/2006 | Andarawis et al. | | 307/52 |
| 7,171,287 B2 * | 1/2007 | Weiss | | 700/291 |
| 7,188,260 B1 * | 3/2007 | Shaffer et al. | | 713/300 |
| 7,202,638 B2 * | 4/2007 | Ye et al. | | 322/37 |
| 7,224,081 B2 * | 5/2007 | Larsen | | 290/44 |
| 7,239,036 B2 | 7/2007 | D'Atre et al. | | 290/44 |
| 7,256,509 B2 | 8/2007 | Brandt et al. | | 290/44 |
| 7,268,443 B2 * | 9/2007 | Kikuchi et al. | | 290/44 |
| 7,312,537 B1 | 12/2007 | Walling et al. | | 290/44 |
| 7,321,221 B2 | 1/2008 | Bücker et al. | | 322/44 |
| 7,332,827 B2 | 2/2008 | Nielsen | | 290/55 |
| 7,339,355 B2 | 3/2008 | Erdman et al. | | 322/29 |
| 7,397,143 B2 | 7/2008 | Walling | | 290/44 |
| 2002/0046155 A1 * | 4/2002 | Mashinsky et al. | | 705/37 |
| 2002/0070715 A1 * | 6/2002 | Sasaki et al. | | 322/28 |
| 2002/0105306 A1 | 8/2002 | Ballantine et al. | | 322/20 |
| 2002/0109411 A1 | 8/2002 | Potter et al. | | 307/64 |
| 2002/0190525 A1 | 12/2002 | Worden et al. | | 290/1 A |
| 2003/0015873 A1 * | 1/2003 | Khalizadeh et al. | | 290/7 |
| 2004/0135436 A1 * | 7/2004 | Gilbreth et al. | | 307/18 |
| 2004/0207206 A1 * | 10/2004 | Wobben | | 290/44 |
| 2004/0245783 A1 * | 12/2004 | Gilbreth et al. | | 290/52 |
| 2004/0264082 A1 | 12/2004 | Suliman et al. | | 361/62 |
| 2005/0152083 A1 * | 7/2005 | Dick | | 361/85 |
| 2006/0082936 A1 * | 4/2006 | Ye et al. | | 361/38 |
| 2006/0163881 A1 | 7/2006 | Bucker et al. | | 290/44 |
| 2006/0163882 A1 | 7/2006 | Brandt | | 290/44 |
| 2006/0192390 A1 | 8/2006 | Juanarena Saragueta et al. | | 290/44 |
| 2006/0208784 A1 * | 9/2006 | Suzuki | | 327/231 |
| 2006/0267560 A1 * | 11/2006 | Rajda et al. | | 323/209 |
| 2007/0085344 A1 | 4/2007 | Janssen et al. | | 290/44 |
| 2007/0159265 A1 | 7/2007 | Weng et al. | | 331/17 |
| 2007/0187955 A1 | 8/2007 | Erdman et al. | | 290/44 |
| 2007/0246943 A1 * | 10/2007 | Chang et al. | | 290/44 |
| 2007/0273155 A1 | 11/2007 | Barton et al. | | 290/44 |
| 2007/0278797 A1 | 12/2007 | Flannery et al. | | 290/44 |
| 2007/0290506 A1 | 12/2007 | Walling | | 290/44 |
| 2008/0001408 A1 | 1/2008 | Liu et al. | | 290/44 |
| 2008/0007121 A1 | 1/2008 | Erdman et al. | | 307/47 |
| 2008/0030027 A1 | 2/2008 | Erdman et al. | | 290/40 |
| 2008/0067815 A1 | 3/2008 | Suryanarayanan et al. | | 290/44 |
| 2008/0069692 A1 | 3/2008 | Oohara et al. | | 416/31 |
| 2008/0073912 A1 | 3/2008 | Fortmann et al. | | 290/44 |

| | | | |
|---|---|---|---|
| 2008/0088129 A1 | 4/2008 | Altemark et al. | 290/44 |
| 2008/0093853 A1 | 4/2008 | Barker et al. | 290/44 |
| 2008/0093854 A1 | 4/2008 | Bucker et al. | 290/44 |
| 2008/0093855 A1 | 4/2008 | Walling | 290/44 |
| 2008/0093856 A1 | 4/2008 | Stiesdal | 290/44 |
| 2008/0093857 A1 | 4/2008 | Stiesdal | 290/44 |
| 2008/0106098 A1 | 5/2008 | Miller et al. | 290/44 |
| 2008/0111380 A1 | 5/2008 | Delmerico et al. | 290/44 |
| 2008/0150282 A1 | 6/2008 | Rebsdorf et al. | 290/44 |
| 2008/0150484 A1* | 6/2008 | Kimball et al. | 320/125 |

FOREIGN PATENT DOCUMENTS

| | | |
|---|---|---|
| CA | 2315003 C | 6/2005 |
| DE | 38 33 719 C1 | 10/1989 |
| DE | 44 28 086 C2 | 2/1996 |
| DE | 296 21 449 U1 | 2/1997 |
| DE | 196 34 464 A1 | 4/1997 |
| DE | 196 20 906 A1 | 1/1998 |
| DE | 196 24 809 A1 | 1/1998 |
| DE | 196 51 364 A1 | 6/1998 |
| DE | 197 19 308 A1 | 11/1998 |
| DE | 199 48 196 A1 | 5/2001 |
| DE | 100 19 362 A1 | 10/2001 |
| DE | 100 22 974 A1 | 11/2001 |
| DE | 100 33 029 A1 | 1/2002 |
| DE | 100 59 018 A1 | 6/2002 |
| EP | 0 677 911 B1 | 3/2000 |
| GB | 2 330 256 A | 4/1999 |
| JP | 8-182202 A | 12/1996 |
| WO | WO 93/11604 | 6/1993 |
| WO | 99/52193 | 10/1999 |
| WO | WO 00/19094 | 4/2000 |
| WO | WO 01/25628 A2 | 4/2001 |
| WO | WO 01/25630 A1 | 4/2001 |
| WO | 01/73518 A1 | 10/2001 |
| WO | 02/086314 A1 | 10/2002 |
| WO | 2004/040748 A1 | 5/2004 |
| WO | 2005/015012 A1 | 2/2005 |

OTHER PUBLICATIONS

Yamamoto, M., et al., "Active and Reactive Power Control for Doubly-Fed Wound Rotor Induction Generator," *IEEE Transactions on Power Electronics* 6(4):624-629, Oct. 1991.

Dahlgren, M. et al., "Großtechnische Nutzung der Windenergie," *ABB Technik* 3:31-37, 2003.

Heier, S., *Grid Integration of Wind Energy Conversion Systems*. Kassel University, Germany. West Sussex: John Wiley & Sons Ltd., 1998. 1, 2, 210, 211, 273-278, 326-339.

Jones, R. et al., "High Quality Mains Power from Variable-Speed Wind Turbines," Wind Engineering vol. 18, No. 1, IEE Conference, Clean Power 2001, Nov. 17-19, 1993, pp. 45-50.

Borle, Lawrence J. et al., "Development and Testing of a 20-kW Grid Interactive Photovoltaic Power Conditioning System in Western Australia," IEEE Transactions on Industry Applications, vol. 33, No. 2, Mar.-Apr. 1997, pp. 502-508.

Notice of Opposition to Grant of Patent (Section 21), in the name of Vestas New Zealand Wind Technology Limited, Mar. 28, 2007, pp. 1-3.

Notice of Opposition to Grant of Patent (Section 21), in the name of Vestas Asia Pacific Wind Technology PTE Ltd, Mar. 28, 2007, pp. 1-2.

Australia, Patents Act 1990 "Statement of Grounds and Particulars", Notice of Opposition, in the name of Vestas Wind Systems A/S of Alsvej 21, DK-8900 Randers, Denmark, dated Jul. 24, 2007, 14 pages.

* cited by examiner

METHOD FOR OPERATING A WIND ENERGY PLANT

BACKGROUND OF THE INVENTION

1. Field of the Invention

The present invention relates to a method for operating a wind turbine with an electrical generator, drivable by a rotor, for supplying electrical power to an electrical load, in particular an electric grid.

The invention further relates to a wind turbine with a rotor and an electrical generator coupled to the rotor for supplying electrical power to an electrical load, in particular an electric grid.

2. Description of the Related Art

In known wind turbines for generating electrical energy from wind energy, the generator with the electrical load, often an electric grid, is operated in a grid-parallel mode. In other words, as soon as the wind supply is sufficient, the wind turbine will generate electrical energy and deliver it to the grid.

However, if a failure occurs in the grid, for example as a result of a short circuit in the grid, wind turbines have hitherto been disconnected from the grid and not reconnected to the grid until normal operating conditions have been restored.

This means that, following such a grid failure, is no longer possible to provide the rapid support for the grid that is particularly needed when there are large fluctuations in the voltage and/or power that is required.

BRIEF SUMMARY OF THE INVENTION

The object of the present invention is therefore to provide a control system for one or more wind turbines that compensate as far as possible for fluctuations in the grid.

This object is achieved with a method of the kind initially specified, in which the power delivered to the load by the generator is regulated in response to a current that is outputted to the load.

In a device of the kind initially specified, the object is achieved by a control device comprising a current sensor for measuring an electrical current delivered to the load, such that the power delivered by the generator to the load can be controlled in response to the current that is received by the current sensor.

In this way, the required power can be generated and delivered when there are fluctuations in the power requirements from the grid.

In order to avoid overload of parts of the wind turbine and/or the grid in the event of a grid failure, for example as a result of a short circuit in the grid, the wind turbine is controlled in such a way that the current delivered to the grid does not exceed a predefined value.

In a particularly preferred embodiment of the invention, the maximum current level that can be delivered is regulated for each grid phase, in order to support the grid as far as possible, on the one hand, without exposing components to the risk of damage, on the other hand.

A particularly preferred embodiment is one in which the wind turbine can be operated by an external input that corresponds to the stipulations made by a distant control station. In this way, a power supply company for example can request the wind turbine to deliver the amount of current which is needed at that moment to support the grid.

Other advantageous embodiments of the invention are described in the subclaims.

BRIEF DESCRIPTION OF THE SEVERAL VIEWS OF THE DRAWING(S)

Figure 2:
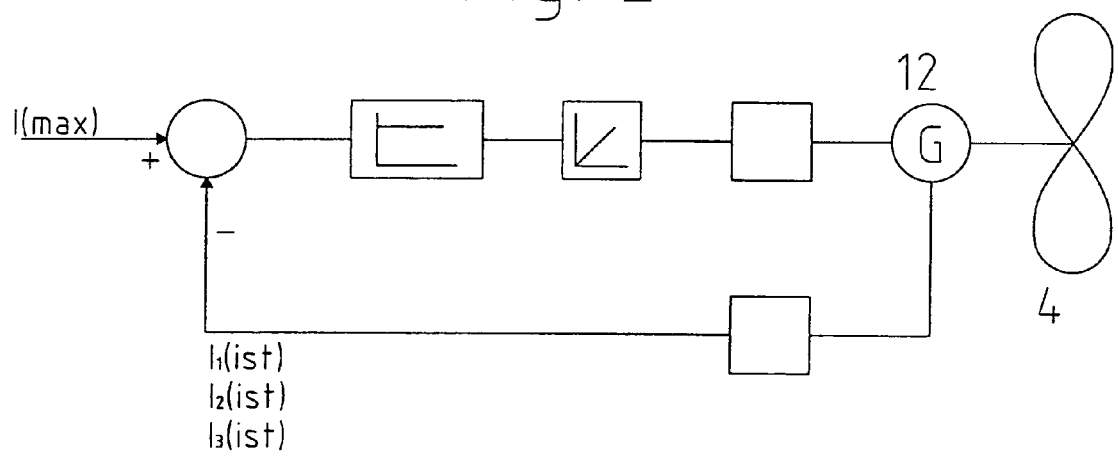
Figure 3:
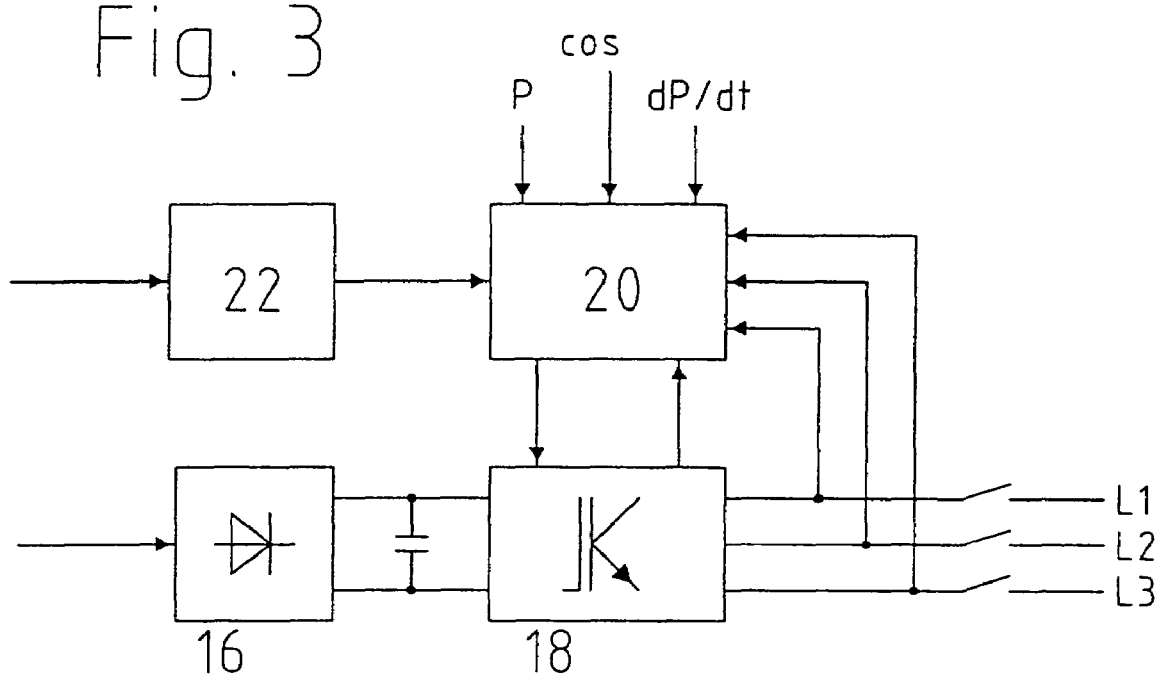

One embodiment of the invention shall now be described in detail with reference to the figures. These show:

FIG. 1 a wind turbine that feeds power to a grid, in a simplified view;

FIG. 2 a control device according to the invention for operating a wind turbine; and FIG. 3 a block diagram of the main components in the control and regulation arrangement.

DETAILED DESCRIPTION OF THE INVENTION

A wind turbine 2, shown in simplified form in FIG. 1, comprising a rotor 4 is connected to an electric grid 6 that may be a public grid, for example. Several electrical loads 8 are connected to the grid. The electrical generator of wind turbine 2, not shown in FIG. 1, is coupled to an electrical control and regulation arrangement 10 that firstly rectifies the alternating current generated in the generator and subsequently converts the current into an alternating current with a frequency corresponding to the grid frequency. Instead of a grid 6, a single load could also be supplied with electrical energy by the wind turbine 2. The control and regulation arrangement 10 has a regulating device according to the invention.

FIG. 2 illustrates the regulating device according to the invention. The rotor 4, shown in simplified form, is coupled to a generator 12 that provides an amount of electrical power that depends on the wind speed and hence on the wind power. The alternating current produced in the generator 12 is initially rectified and subsequently converted into an alternating current that has a frequency corresponding to the grid frequency.

With the help of a current sensor (not shown), the amount of current being fed into the grid 6 (FIG. 1) is detected. Said current is compared at the same time with a predefined value I(max).

If the current fed into the grid 6 now exceeds the predefined maximum current I(max), the power generated by the entire wind turbine (and/or its generator) is adjusted by the regulating device in such a way that the current delivered to the grid does not exceed the predefined threshold value I(max). In the event of a short circuit, said current regulation can be accomplished, for example, by the wind turbine delivering a significantly lower level of power output to the grid than previously, while using elsewhere outside the grid the power that consequently is not fed to the grid, for example for a dumpload (resistance), or by feeding the power which is not fed to the grid to capacitors or other interim storage devices. As soon as full availability of the grid is restored, delivery of the stored energy to the grid can be resumed.

In this way, even when there is a short circuit in the grid, the wind turbine can continue to deliver power to the grid and support the grid without the current exceeding the predefined threshold value as a result of the short circuit.

FIG. 3 shows constituent parts of the control and regulation arrangement 10 in FIG. 1. The control and regulation arrangement 10 includes a rectifier 16, in which the alternating current produced by the generator is rectified. An inverter 18 connected to the rectifier 16 converts the direct current back into an alternating current with a frequency corresponding to the grid frequency. This current is fed into the grid 6 in three phases L1, L2 and L3. The inverter 18 is controlled with the help of a microcontroller 20 that forms part of the regulating device. The microprocessor 20 is coupled for this purpose to the inverter 18. The input variables for regulating the current with which the electrical power provided by the wind turbine 2 is fed into the grid 6 are the momentary current and/or the momentary currents, the grid frequency, the electrical power output P of the generator, the power factor cos φ and the power gradient dP/dt. Regulation, pursuant to the invention, of the current to be delivered to the grid is implemented in microprocessor 20. The current in each of phases L1, L2 and L3 is separately detected and the respective levels are taken into account in the regulation arrangement pursuant to the invention.

If the measured current (level) I(actual) of a phase rises above a predetermined maximum current, the inverter 18 is controlled in such a way that the current (level) falls below the predefined maximum current I(max), with the electrical energy generated from wind energy and not delivered to the grid being used elsewhere, for example by being outputted to a resistance (dumpload) or stored in an interim storage device (e.g., a capacitor or Ultracap).

The control system for the wind turbine can operate independently. The wind turbine then detects a short circuit in the grid, for example by monitoring the voltages of the separate grid phases and/or their phase position. If predefinable threshold values for voltages and/or phase differences are reached, the wind turbine recognizes a short circuit and operates according to an algorithm provided for such a case.

Owing to the external access (22), it is possible, for example for the power supply company to whose grid the wind turbine is connected, to intervene in the operation of the wind turbine and, for example, to modify the amount of current to be delivered to the grid, the type of current (active current, reactive current) and/or the phase angle and/or phase position, etc. In this way, the power supply company can adjust precisely those values (current, voltage, electrical power) in respect of the power to be delivered to the grid by the wind turbine that correspond to the requirements of the network operator.

The invention claimed is:

1. A method for operating a power system comprising:
generating electrical power with an electrical generator of a wind power installation driven by a rotor to output the electrical power to an electrical grid;
sensing an electrical current of the electrical power outputted to the electrical grid to detect a fault in the grid;
maintaining connection of the wind power installation to the grid during the fault to continue to supply electrical current to the grid from the wind power installation during the fault;
limiting the electrical current delivered by the wind power installation to the grid during the fault to less than a selected amount;
controlling the wind power installation from a control station distant from the wind power installation to remotely adjust the amount of electrical current delivered by the wind power installation to the grid during the fault; and
resuming normal function of the wind power installation when the fault is no longer in the grid.

2. The method of claim 1, further comprising:
regulating the electrical power outputted by the generator to a load in response to an amount of current outputted to the load.

3. The method of claim 1,
wherein the electrical current is an alternating current with a predefinable frequency.

4. The method of claim 3,
wherein the predefinable frequency is substantially equal to a frequency of the grid.

5. The method of claim 1,
wherein the outputted power does not exceed a predefinable amount, has a predefinable phase position and includes a predefinable proportion of reactive current.

6. The method of claim 5,
wherein the power system is a multiphase system and phase position and a proportion of reactive current for each phase do not exceed a predefinable value.

7. The method of claim 6,
wherein for each phase a value independent of other phases can be predefined.

8. The method of claim 1,
wherein the electrical current is limited for every phase affected by a short circuit to a momentary value at a moment the short circuit occurs.

9. The method of claim 1 wherein the fault corresponds to a grid voltage reaching a value that deviates by more than 20% from a reference value.

10. The method of claim 1 wherein the fault is a short circuit.

11. The method of claim 1, further comprising:
limiting the electrical power outputted to the electrical grid to at least a predefinable amount of electrical power.

12. The method of claim 1, further comprising:
limiting the electrical power outputted to the electrical grid to at least a predefinable phase position.

13. The method of claim 1, further comprising:
limiting the electrical power outputted to the electrical grid to at least a predefinable proportion of reactive current.

14. The method of claim 1 wherein the fault is a grid voltage fault.

15. The method of claim 1 wherein the fault is a phase position fault.

16. A power system, comprising:
a wind power installation including:
an electrical generator coupled to a rotor to output electrical power to an electrical grid;
a sensor operable to detect a fault in the grid;
a regulating device configured to maintain connection of the wind power installation to the grid during the fault and to continue to supply a limited current from the wind power installation to the grid during the fault; and
an external command input; and
a control station remote from the wind power installation operable to adjust the limited current during the fault by commands given to the external command input of the wind power installation.

17. The power system of claim 16, wherein the regulating device of the wind power installation includes:
a microprocessor operable to compare a sensed electrical current outputted to the grid with a selected current value.

18. The power system of claim 16 wherein the external command input transfers data to the regulating device.

19. The power system of claim 16 wherein the sensor of the wind power installation includes:
a device to detect a short circuit in the grid.

20. The power system of claim 19 wherein the sensor of the wind power installation comprises:
a voltage sensing device to detect a voltage of at least one phase in the grid.

21. The power system of claim 19 wherein the sensor of the wind power installation comprises:
a phase monitor to detect a phase position of currents and voltages of at least one phase in the grid.

22. The power system of claim 16 wherein the fault is a short circuit, and
wherein the electrical generator remains connected to the grid when the short circuit occurs.

23. The power system of claim 18, wherein:
control signals are received via the external command input from a grid operator, and in response to said control signals from the grid operator the wind power installation is controlled in response to needs of the grid operator and hence that electrical power, including a non-reactive power, a wind power, a current position, a voltage position or a phase position, is fed into the grid in a form as required by the grid operator.

24. The power system of claim 16, wherein the fault corresponds to a grid voltage reaching a value that deviates by more than 20%.

25. The power system of claim 16 wherein the wherein the fault is a short circuit.

26. The power system of claim 16 wherein the wind power installation remains connected to the grid when a grid voltage reaches a value that deviates by more than 20% from a reference value.

27. The power system of claim 16 wherein the wind power installation remains connected to the grid when a grid voltage reaches a value that deviates by more than 40% from a reference value.

28. The power system of claim 16, comprising:
a rectifier coupled to the generator and operable to rectify alternating current (AC) power produced by the generator to direct current (DC) power; and
an inverter coupled between the rectifier and the grid and operable to convert the DC power to AC power with a frequency corresponding to a grid frequency.

29. The power system of claim 28, comprising:
a microprocessor operable to control at least the inverter, wherein the inverter is controlled so that at least the electrical current of the electrical power output to the electrical grid does not exceed a selected value.

30. A method for operating a wind turbine comprising:
generating electrical power from a generator coupled to a rotor and driven by wind;
outputting the electrical power from the wind turbine to an electrical grid;
detecting a fault in the electrical grid based upon a sensed parameter; and
regulating the electrical power output to the electrical grid such that at least an electrical current of the electrical power output to the electrical grid does not exceed a selected amount, and such that the wind turbine remains operable and connected to the electrical grid so that the electrical power is output to the electrical grid during the fault;
controlling the amount of power supplied by the wind turbine to the grid by commands submitted to an external command input of the wind power turbine from a control center remote from the wind power turbine; and
resuming normal function of the wind turbine when the fault is no longer on the grid.

31. The method of claim 30, wherein the sensed parameter is a grid voltage.

32. The method of claim 30, wherein the sensed parameter is a phase position of a phase of the grid.

33. The method of claim 30, further comprising:
sensing a grid voltage deviation of more than 20% from a reference value to determine the occurrence of the substantial disruption.

34. The method of claim 30, further comprising:
sensing a grid voltage deviation of more than 40% from a reference value to determine the occurrence of the substantial disruption.

35. The method of claim 30, further comprising:
sensing an electrical current of the electrical power output to the electrical grid such that regulating the electrical power is based upon the sensed electrical current.

36. The method of claim 30, further comprising:
sensing a grid frequency of the electrical power output to the electrical grid such that regulating the electrical power is based upon the sensed grid frequency.

37. The method of claim 30 further comprising:
sensing an amount of the electrical power output to the electrical grid such that regulating the electrical power is based upon the sensed power amount.

38. The method of claim 30, further comprising:
sensing a power gradient of the electrical power output to the electrical grid such that regulating the electrical power is based upon the sensed power gradient.

39. The method of claim 30, further comprising:
sensing a power factor of the electrical power output to the electrical grid such that regulating the electrical power is based upon the sensed power factor.

40. The method of claim 30, further comprising:
rectifying an alternating current (AC) power produced by the generator of the wind turbine to direct current (DC) power;
converting the DC power to AC power with a frequency corresponding to a grid frequency; and
monitoring a parameter associated with the AC power output to the grid such that at least the electrical current of the generator does not exceed a selected generator current value during the fault.

41. The method of claim 30, further comprising:
sensing a short circuit on the grid to determine occurrence of the fault.

* * * * *